United States Patent [19]

Allen

[11] Patent Number: 4,518,108
[45] Date of Patent: May 21, 1985

[54] FOLDING CARRIER

[76] Inventor: Richard A. Allen, Bowles Ter., Lincoln, Mass. 01773

[21] Appl. No.: 567,579

[22] Filed: Jan. 3, 1984

[51] Int. Cl.³ .............................................. B60R 9/10
[52] U.S. Cl. .................................. 224/314; 224/321; 224/42.03 B
[58] Field of Search ................. 224/42.03 B, 309, 314, 224/329, 321, 42.03 R, 324, 325, 326, 327, 917

[56] References Cited

U.S. PATENT DOCUMENTS

| | | | | |
|---|---|---|---|---|
| 3,710,999 | 1/1973 | Allen | ............................ | 224/42.03 B |
| 4,290,540 | 9/1981 | Allen | ................................. | 224/321 |
| 4,332,337 | 6/1982 | Kosekoff | ........................... | 224/309 |

Primary Examiner—Stephen Marcus
Assistant Examiner—David Voorhees
Attorney, Agent, or Firm—Herbert L. Bello

[57] ABSTRACT

A folding carrier for carrying objects on an automobile or the like has a frame to which a carrying member and a supporting member are pivotally mounted for movement between collapsed and extended positions. The carrying member is held by a pair of braces in its extended position for carrying objects and the supporting member is held in its extended position by bearing against the frame. The carrying member is a substantially U-shaped member having a front foot bar and a pair of extending arms and the supporting member is a substantially U-shaped member having a rear foot bar and a pair of extending legs. When the carrier is in its operative extended position, the weight of an object being carried is distributed on feet mounted on the foot bars of each carrying and supporting members.

12 Claims, 3 Drawing Figures

FOLDING CARRIER

BACKGROUND OF THE INVENTION

1. Field of the Invention

The present invention relates to carriers that are configured to be attached to motor vehicles for carrying such objects as bicycles, skis, luggage and the like and, more particularly, is directed towards foldable carriers of the foregoing type in which the weight of the object is distributed on the carrier's feet.

2. Description of the Prior Art

In recent years, the popularity of bicycle riding for sport, recreation and transportation has increased. Bicycle carriers of various configurations have been designed which enable the bicycle owner to transport one or more bicycles from place to place by means of his automobile. Carriers of the type in which the weight of the bicycles is distributed on feet are shown in U.S. Pat. Nos. 3,710,999; 3,927,811; 4,290,540; and 4,332,337. Such carriers have been introduced with varying degrees of success. A need has arisen for an automobile carrier of the foregoing type which can be mounted and demounted easily and which can be collapsed into a flat configuration for easy shipment and storage.

SUMMARY OF THE INVENTION

It is an object of the present invention to provide a folding carrier of the type in which the weight of the object being carried is distributed over upper and lower carrier feet. In addition, the folding carrier can be easily mounted to and demounted from a motor vehicle and folded into a relatively flat configuration for easy shipment and storage. The carrier includes a main frame to which a carrying member and a supporting member are pivotally mounted for movement between a collapsed position and an extended position. The carrying member is substantially U-shaped member having a front foot bar and a pair of extending arms and the supporting member is a substantially U-shaped member having a rear foot bar and a pair of extending legs. The carrying member is held in its extended position by a pair of braces and the supporting member is held in its extended position by bearing against the main frame. Straps are provided for holding the supporting member and for securing the carrier to the motor vehicle in its extended position. In the extended position, feet on the foot bars of the carrying and supporting members are in contact with the motor vehicle. As the supporting member is rotated from the collapsed position to the extended position, it bears against the main frame and is prevented from further rotation in that direction.

Other objects of the present invention will in part be obvious and will in part appear hereinafter.

The invention accordingly comprises the apparatuses and systems, together with their parts, elements and inerrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
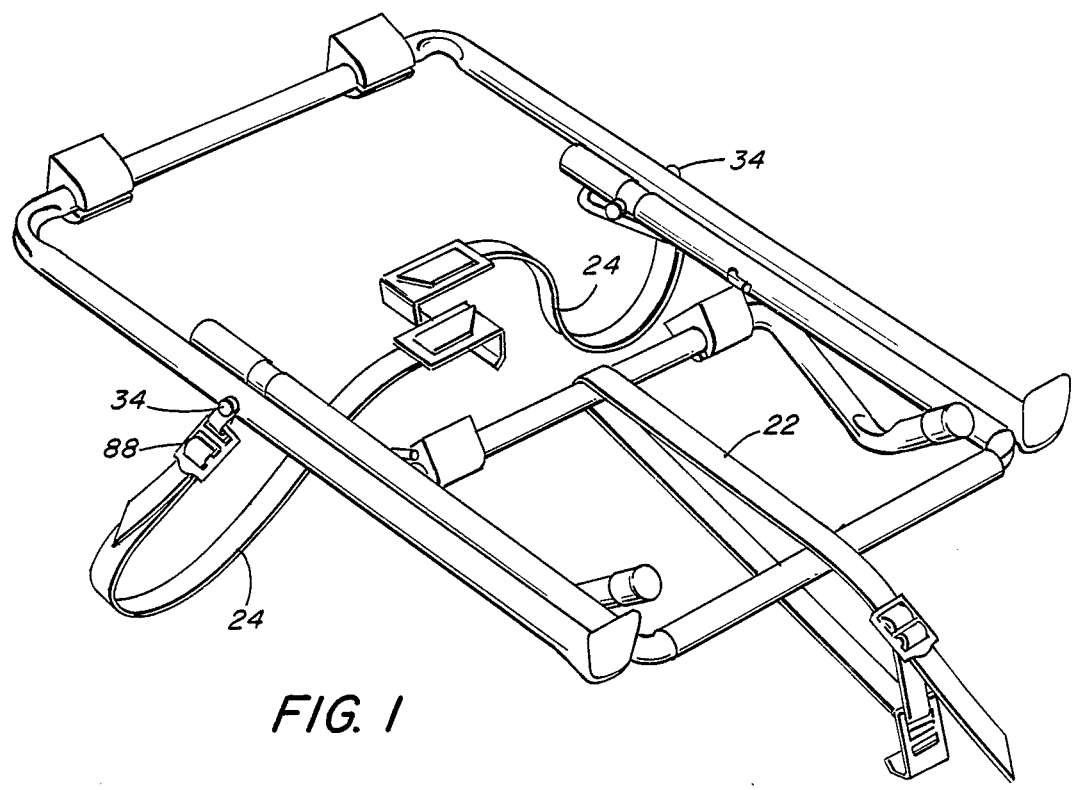
FIG. 1 is a perspective view of a foldable carrier embodying the invention in a collapsed or folded position.
Figure 3:
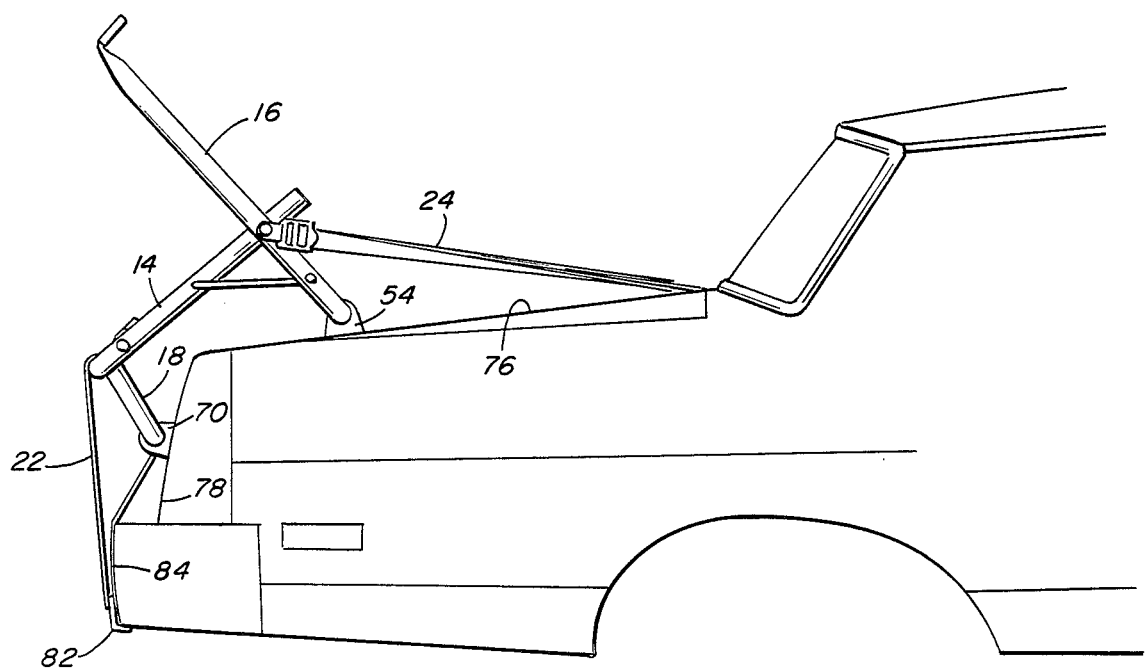
FIG. 3 is a side view of the carrier of FIG. 2 in its extended position and mounted on an automobile trunk.
Figure 2:
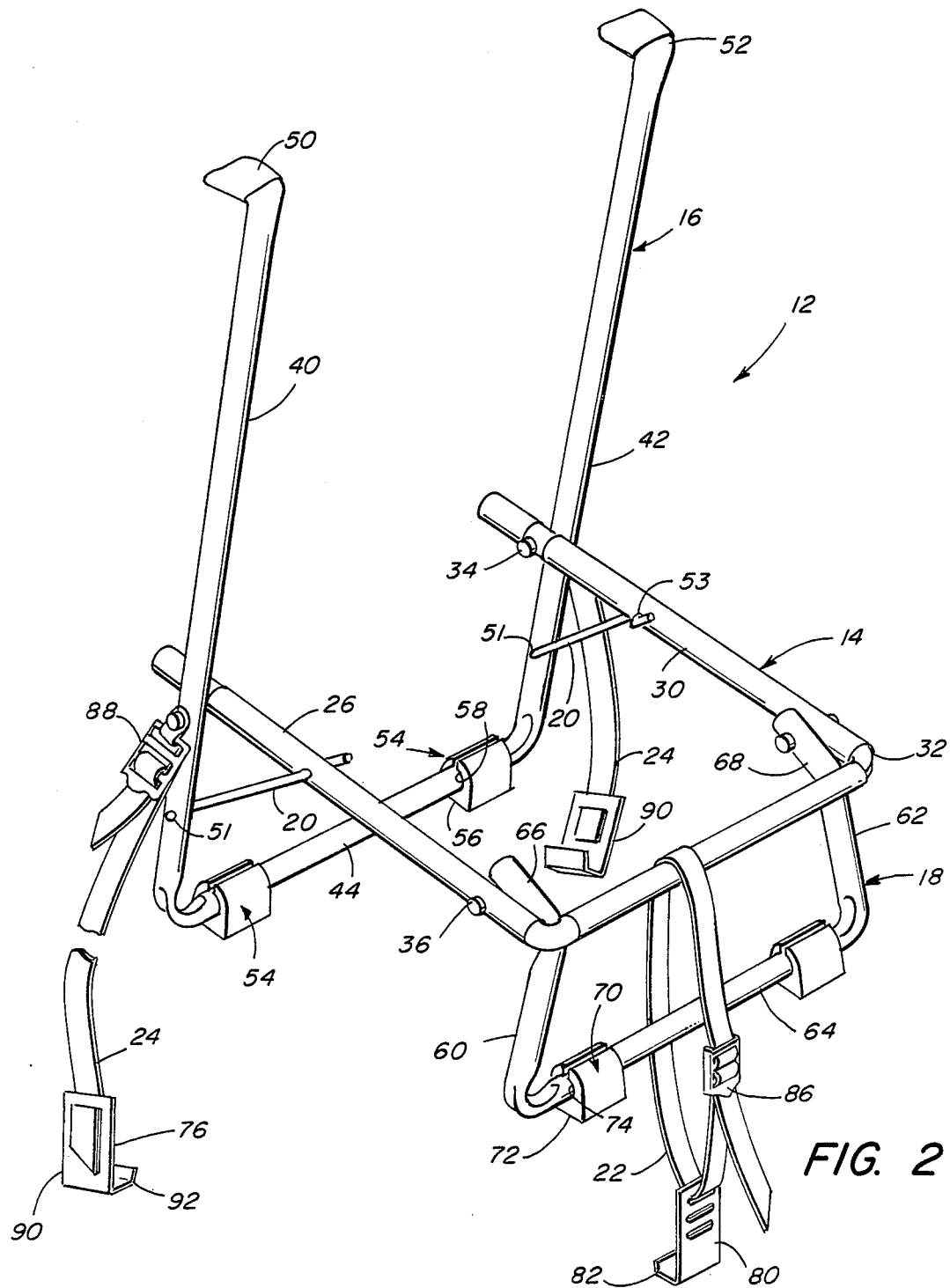
FIG. 2 is a perspective view of the carrier of FIG. 1 in its extended position.

Referring now to the drawings, in FIG. 3 there is shown a folding carrier 12 embodying the present invention mounted on an automobile trunk lid. As hereinafter described, folding carrier 12 is movable between a flat collapsed position and an erect extended position. The flat collapsed or folded position is shown in FIG. 1 and the erect or extended position is shown in FIGS. 2 and 3.

Folding carrier 12 includes a main frame 14, a carrying member 16 and a supporting member 18. A pair of bracing members 20 are provided for holding carrying member 16 at a selected amgular position with respect to main frame 14. Attaching hardware such as a rear strap 22 and front straps 24 secure carrier 12 to the automobile. Rear strap 22 is placed over both main frame 14 and supporting member 18. Front straps 24 are attached to opposite sides of carrying member 16. Main frame 14, a substantially U-shaped member, for example a hollow metal pipe, includes a first side leg 26, a cross member 28 and a second side leg 30. Protective covers 32 are provided on main frame 14. Carrying member 16 is pivotally mounted to an upper portion of side legs 26 and 30 by means of pins or fasteners 34, for example screws with lock nuts. Supporting member 18 is pivotally mounted to a lower end of side legs 26 and 30 by means of pins or fasteners 36, for example screws with lock nuts. Carrying member 16 is mounted on the outside of side legs 26, 30 and supporting member 18 is mounted on the inside of side legs 26, 30.

Carrying member 16, a substantially U-shaped member, for example a hollow metal pipe, includes a pair of arms 40, 42 and a base member or front foot bar 44. The ends of arms 40 and 42 are bent upwardly to form stops 50 and 52. Opposite ends of braces 20, for example, bent rods, are received in holes 51 and 53 formed in carrying members 40,42 and side legs 26,30, respectively. The ends of braces 20 which are received in holes 53 are reversely bent to hold the braces therein. The other ends of the braces 20 which are received in the holes 51 are bent greater than ninety degrees to prevent the braces from inadventently coming out of the holes when a heavy load is being carried on the carrying arms. A suitable protective covering, such as a plastic tubing or the like, may cover all of or a portion of arms 40,42 and stops 50 and 52. A pair of feet 54, for example resilient feet such as molded rubber members with flat bottoms 56 and a split circular portion 58, are mounted on front foot bar.

Supporting member 18, a substantially U-shaped member, for example a hollow metal pipe, includes a pair of legs 60,62 and a base member or rear foot bar 64. The end portions 66 and 68 of legs 60 and 62, respectively, are bent so that the corner formed at the bend acts as a stop to hold the supporting member 18 in its extended position. Rear foot bar 64 is long enough so that it rests against side legs 26 and 30 when the supporting member 18 is in its collapsed position. The corners of base member 64 and legs 60,62 are bent greater than ninety degrees to permit the end portions 66 and 68 to be fastened to the inside of the side legs 26 and 30. The corners of base member 64 and legs 60-62 are bent in the manner described so as to form a rear foot bar which is sufficiently long to prevent it from passing between the side legs when the supporting member 18 is in its collapsed position. That is, the length of the rear foot bar 64 is greater than the length of cross member 28. A pair of feet 70, for example, resilient feet such as molded rubber members with flat bottoms 62 and a split circular portion 74 are mounted on base 64.

When carrier 12 is mounted on an automobile as shown in FIG. 3, feet 54 press against the trunk lid 76 and feet 70 press against the lower body panel 78. Strap 22 is threaded about both the cross member 28 and the rear foot bar 64. Strap 22 is also threaded through a clamp 80 having a hooked end portion 82 which is secured to the rear bumper 84. A buckle 86 is provided to tighten strap 22. Each strap 25 is threaded through a buckle 88 which is secured to one fastener 34. A clamp 90 having a hooked end portion 92 is attached to each strap 24 and the hooked end is secured to the top of the trunk lid 76.

Movement of the folding carrier 12 from its extended position shown in FIG. 2 to its folded or collapsed position shown in FIG. 1 is accomplished by merely removing the ends of braces 20 from holes 51 and pivoting carrying member 16 and supporting member 18. When carrier 12 is in the extended position shown in FIGS. 1 and 3, the major part of carrying arms 40,42 and the major part of supporting legs 60,62 extend in opposite directions from opposite ends of frame 14 in a substantially parallel relationship to one another and in substantially perpendicular relationship to the frame. Carrying member 16 is held generally perpendicular to frame 14 when in its extended position by braces 20. The corner formed between the end portion 66 and leg 60, and the corner formed between the end portion 68 and leg 62 define stops which limit rotational movement of supporting member 18 and hold the supporting member in its extended position. When a bicycle is positioned on carrying arms 40,42, the weight of the bicycle is distributed over feet 54 and feet 70 which are fitted over front foot bar 44 and over rear foot bar 64, respectively. The flat bottoms of the feet 54 and feet 70 distribute the weight of the bicycle over a greater area than the weight distribution provided by feet in the form of caps on the ends of the tubular members. Side legs 60,62 and the parts of arms 40,42 below frame 14 are sufficiently long to keep the bicycle pedals from hitting the automobile.

When the carrier 12 is in its collapsed position, frame 14, carrying member 16 and supporting member 18 are substantially in side-by-side relationship to one another. Initially, carrying member 16 is rotated counterclockwise from the extended position shown in FIG. 2 to the collapsed position shown in FIG. 1. Then, the ends of braces 20 are inserted into holes 51. It is to be noted that carrying member 16 is mounted to main frame 14 in such a manner that front foot bar 44 passes over the top of side legs 26 and 30 when carrying member 16 is rotated from its collapsed position to its extended position. That is, the distance from screw 34 to front foot bar 44 is greater than the distance from screw 34 to the ends of side legs 26,30 of frame 14. When supporting member 18 is rotated from its collapsed position (FIG. 1) to its extended position (FIG. 2) by moving it in a counterclockwise direction, the corners of legs 60 and 62 engage the corners of side legs 26,30, thereby preventing further rotation of the supporting member. The carrying member 16 is held rigidly by braces 20 and the supporting member 18 is now braced against frame 14, thereby providing a rigid support for articles such as bicycles, for example, which are to be carried on carrying arms 40 and 42. Carrying member 16 moved from its extended position shown in FIG. 2 to its collapsed position shown in FIG. 1 first by pulling bracing members 20 out of holes 51 and then by rotating carrying member 18 clockwise to its collapsed position. Supporting member 18 is moved to its collapsed position by merely rotating it clockwise. When the folding carrier is mounted on the automobile, the supporting member 18 is held in its extended position by the strap 22 which passes over it and the cross member 28.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A folding carrier mountable on an automobile or the like, said carrier comprising:
   (a) a frame;
   (b) a carrying member pivotally mounted to said frame said carrying member movable about a first axis between an operative extended position and a collapsed position, said carrying member and said frame being in a substantially side-by-side relationship when said carrying member is in its collapsed position, a foot of said carrying member positioned to contact the automobile when said carrying member is in its operative extended position;
   (c) bracing means mounted to said frame and configured to engage and disengage said carrying member, said carrying member fixed in its extended position when said bracing means is in engagement with said carrying member; and
   (d) a supporting member pivotally mounted to said frame and constrained for limited rotational movement relative thereto between an extended position and a collapsed position about a second axis, said first axis being parallel to said second axis, when said supporting member is in its extended position, a portion of said supporting member is pressed against said frame and said supporting member is prevented from further movement relative to said frame, said supporting member and said frame being in a substantially perpendicular relationship to one another when said supporting member is in its extended position, said supporting member and said frame being in a substantially side-by-side relationship when said carrying member is in its collapsed position, a foot portion of said supporting member positioned to contact the automobile when said supporting member is in its operative extended position.

2. The folding carrier as claimed in claim 1 wherein said frame includes a first side leg, a second side leg and a cross member, said carrying member and supporting member pivotally mounted to said first and second side legs.

3. The folding carrier as claimed in claim 1 wherein said carrying member is mounted on the outside of said frame and said supporting member is mounted on the inside of said frame.

4. The folding carrier as claimed in claim 3 wherein said carrying member includes a pair of arms and a front foot bar, one of each said arms pivotally mounted to one of each said side legs of said frame, said front foot bar is positioned to contact the automobile when said carrying member is in its operative extended position.

5. The folding carrier as claimed in claim 4 wherein said supporting member includes a pair of legs and a rear foot bar, each said leg being bent adjacent its end to form a corner which bears against said frame when said supporting member is in its operative extended position, said rear foot bar is positioned to contact the automobile when said supporting member is in its operative extended position.

6. The folding carrier as claimed in claim 5 wherein said rear foot bar is longer than said cross member.

7. The folding carrier as claimed in claim 4 including feet mounted on said front and rear foot bars, the weight of an object carried on the folding carrier being distributed over said feet.

8. The folding carrier as claimed in claim 6 wherein said feet includes a pair of resilient feet mounted to each said front and rear foot bars, each said resilient foot having a substantially flat bottom.

9. A folding carrier mountable on an automobile or the like, said carrier comprising:

(a) a frame;

(b) a supporting member pivotally mounted to said frame, said supporting member having stop means which constrains said supporting member against full rotational movement relative to said frame, said supporting member rotatable about a first axis between an operative extended position and a collapsed position, said supporting member rotated in a first direction from said extended position to said collapsed position and in a second direction from said collapsed position to said extended position, said first direction opposite said second direction, said supporting member and said frame being substantially perpendicular to one another when said supporting member is in its extended position, said supporting member and said frame being in a substantially side-by-side relationship when said carrying member is in its collapsed position, a foot portion of said supporting member positioned to contact the automobile when said supporting member is in its operative extended position;

(c) a carrying member pivotally mounted to said frame said carrying member movable about a second axis between an extended position and a collapsed position said first axis being parall to said second axis, said carrying member and said frame being in a substantially side-by-side relationship when said carrying member is in its collapsed position, a foot portion of said carrying means positioned to contact the automobile when said carrying member is in its operative extended postion; and (d) bracing means mounted to said frame and configured to engage and disengage said carrying member, said carrying member and said frame being in a fixed relationship when said bracing means is in engagement with said carrying member.

10. The folding carrier as claimed in claim 9 wherein said frame includes a first side leg, a second side leg and a cross member, said frame having a substantially U-shaped profile.

11. The folding carrier as claimed in claim 10 wherein said supporting member includes a pair of legs and a rear foot bar, said legs having bent end portions, each said leg end portion pivotally mounted to one of each said side legs of said frame, said supporting member having a substantially U-shaped profile, said rear foot bar positioned to contact the automobile when said supporting member is in its operative extended position.

12. The folding carrier as claimed in claim 10 wherein said carrying member includes a pair of arms and a front foot bar, one of each said arms pivotally mounted to one of each said side legs of said frame, said carrying member having a substantially U-shaped profile, said front foot bar positioned to contact the automobile when said carrying member is in its operative extended position.

* * * * *